United States Patent
Omi

(10) Patent No.: US 6,676,711 B2
(45) Date of Patent: Jan. 13, 2004

(54) HOLE CUTTER

(75) Inventor: Shohei Omi, Anjo (JP)

(73) Assignee: Omi Kogyo Co., Ltd., Aichi-ken (JP)

( * ) Notice: Subject to any disclaimer, the term of this patent is extended or adjusted under 35 U.S.C. 154(b) by 0 days.

(21) Appl. No.: 10/170,898

(22) Filed: Jun. 13, 2002

(65) Prior Publication Data

US 2002/0189418 A1 Dec. 19, 2002

(30) Foreign Application Priority Data

Jun. 14, 2001 (JP) ........................................ 2001-179879

(51) Int. Cl.⁷ .............................................. B23D 57/00
(52) U.S. Cl. ............................. 8/847; 83/851; 408/204
(58) Field of Search ............................ 408/204, 703; 83/851, 849, 847, 852

(56) References Cited

U.S. PATENT DOCUMENTS

| | | |
|---|---|---|
| 2,412,433 A | 12/1946 | Taylor |
| 3,609,056 A | 9/1971 | Hougen |
| 4,322,188 A * | 3/1982 | Hougen ................. 408/206 |
| 4,586,857 A | 5/1986 | Ohmi |
| 4,758,120 A | 7/1988 | Bijl |
| 4,952,102 A * | 8/1990 | Hougen ................. 408/204 |
| 5,240,357 A * | 8/1993 | Omi ....................... 408/204 |
| 5,417,526 A | 5/1995 | Stock et al. |
| 5,988,956 A | 11/1999 | Omi et al. |

\* cited by examiner

*Primary Examiner*—Timothy V. Eley
*Assistant Examiner*—John Windmuller
(74) *Attorney, Agent, or Firm*—Robert D. Buyan; Stout, Uxa, Buyan & Mullins, LLP

(57) ABSTRACT

A cylindrical blade body of a hole cutter includes blades and grooves. Each of the blades is disposed alternately with a corresponding one of the grooves. A cutting edge of each blade includes an outer cutting edge, an inner cutting edge, and a stepped cutting edge. The outer cutting edge of each blade has a point located at a radial outer position of the outer cutting edge. The inner cutting edge of each blade has a point located between the inner cutting edge and the stepped cutting edge. The heights of the points of the inner cutting edges are substantially equal for all blades. The heights of the points of the outer cutting edges are different among the blades. This hole cutter makes it possible to reduce anti-cutting resistance and obtain an optimal cutting state.

9 Claims, 8 Drawing Sheets

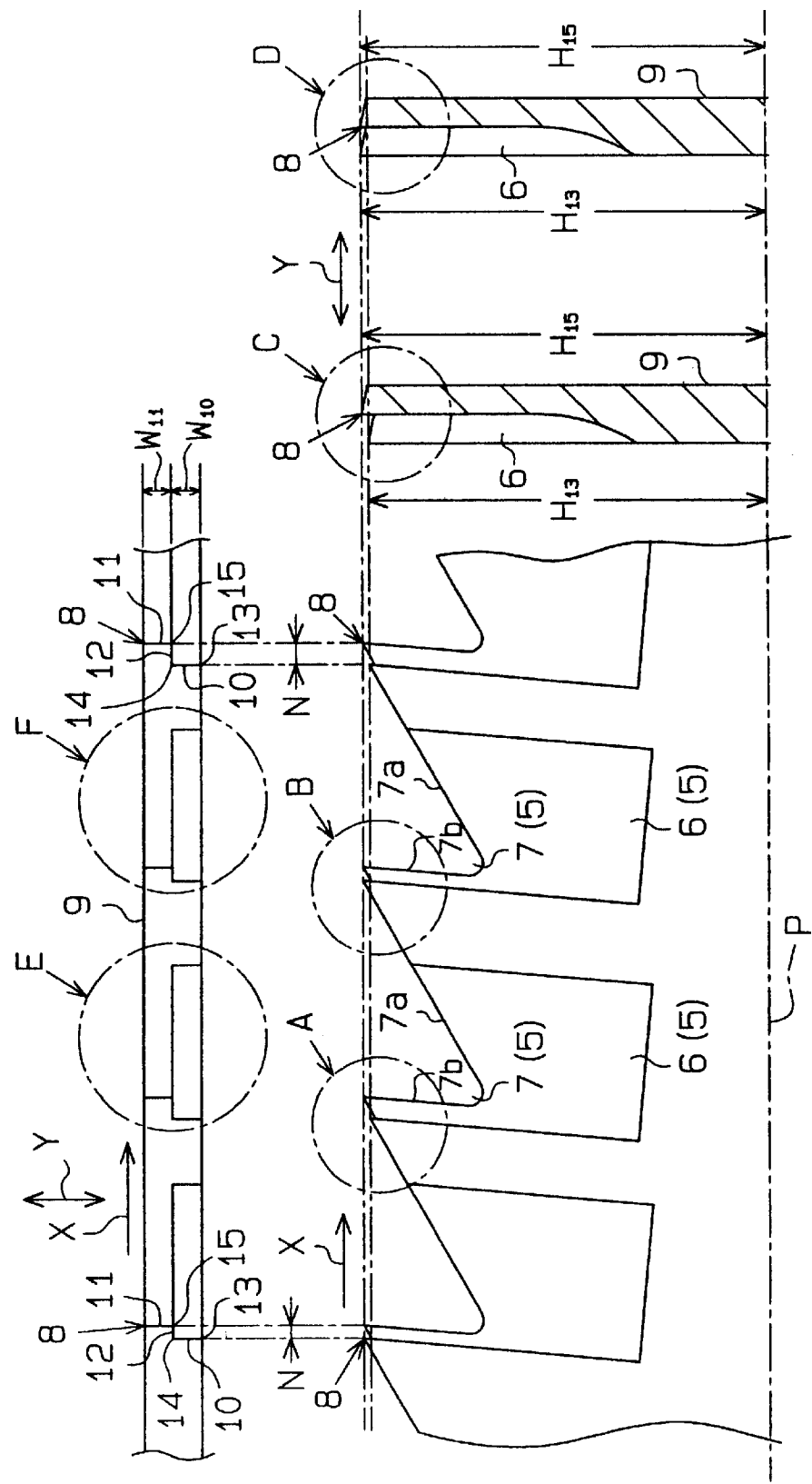

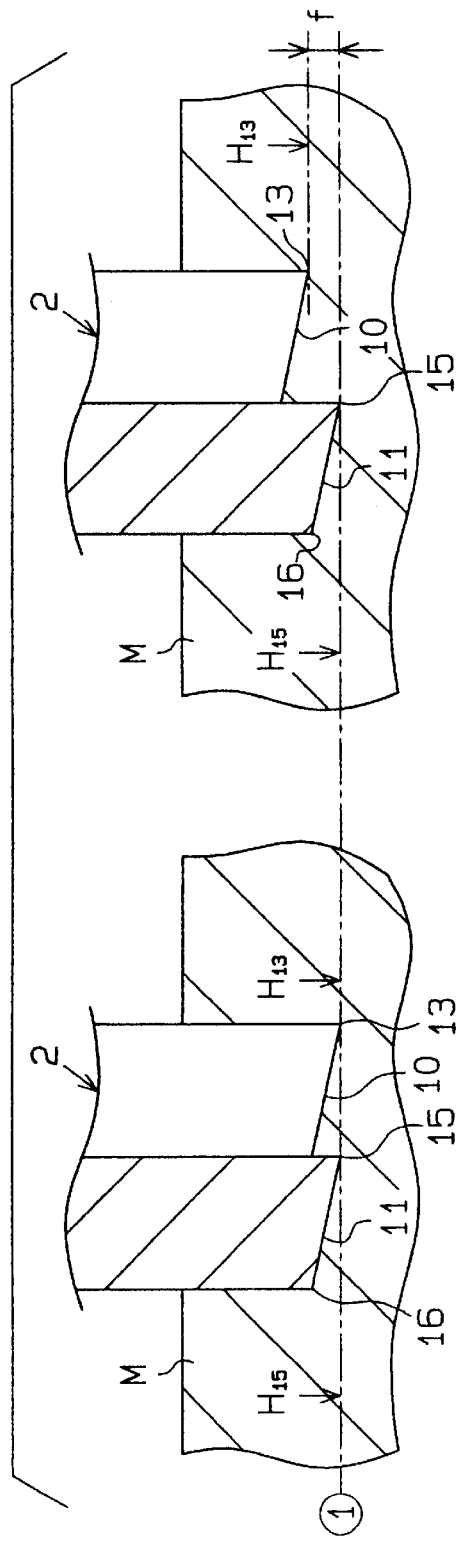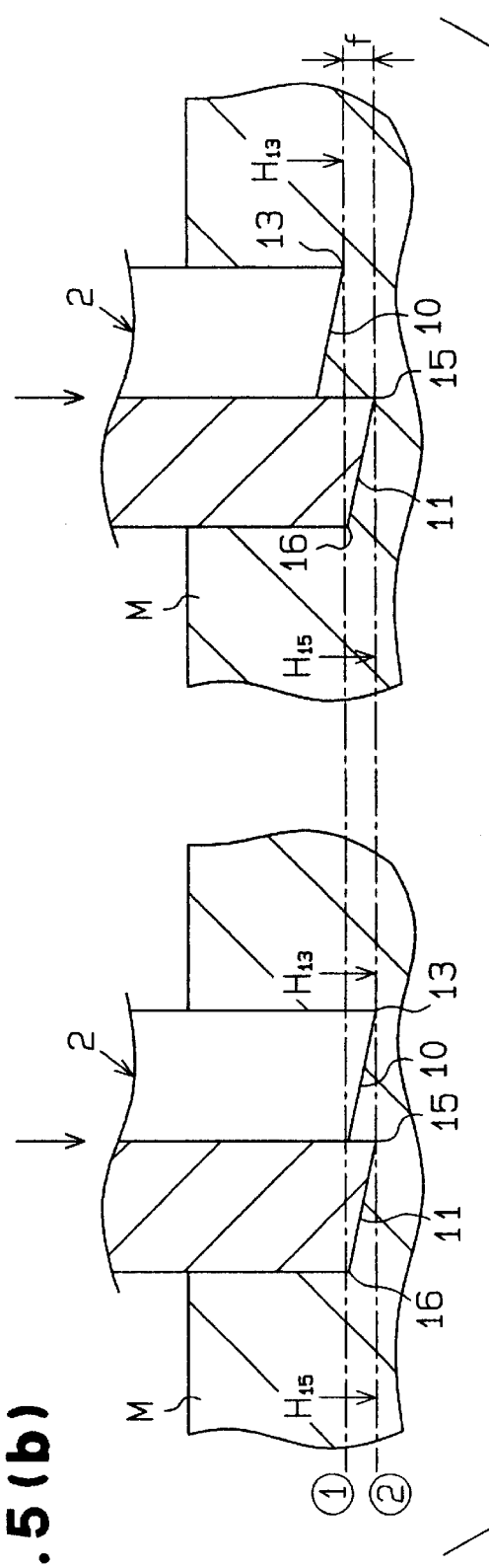
Fig.5(a)
Fig.5(b)

HOLE CUTTER

BACKGROUND OF THE INVENTION

The present invention relates to improvement of cutting edges of blades of a hole cutter in which each one of the blades is disposed alternately with a corresponding one of grooves in a rotational direction of the hole cutter.

FIGS. 6(a) to 8 show a prior art hole cutter. With reference to FIGS. 6(a) and 6(b), the hole cutter includes a cylindrical blade body 2 with an inner hollow space 9. Blades 4 and grooves 5 are located at a circumferential wall of the blade body 2. Each one of the blades 4 is disposed alternately with a corresponding one of the grooves 5 in a rotational direction of the blade body 2. Referring to FIG. 7, a cutting edge 8 of each blade 4 includes an outer cutting edge 10, an inner cutting edge 11, and a stepped cutting edge 12, which is located between the outer cutting edge 10 and the inner cutting edge 11. More specifically, in each cutting edge 8, the outer cutting edge 10 extends from an outermost point 13 to a corner portion 14 in a radial direction Y of the blade body 2. The inner cutting edge 10 extends from an intermediate point 15 to an innermost point 16 in the radial direction Y. The stepped cutting edge 12 extends from the corner portion 14 to the intermediate point 15 in a rotational direction X of the blade body 2. That is, the outer cutting edge 10 and the inner cutting edge 11 of each cutting edge 8 are located slightly offset from each other in the rotational direction X.

With reference to FIG. 7, the heights $H_{15}$ of the intermediate points 15, which are located at radial outer positions of the inner cutting edges 11, are equal for all blades 4. Also, the heights $H_{13}$ of the outermost points 13, which are located at radial outer positions of the outer cutting edges 10, are equal for all blades 4. The heights $H_{13}$ and $H_{15}$ are measured along the rotational axis 1a of the blade body 2 with respect to a predetermined reference plane P, which is shown in FIG. 6(a).

With reference to FIGS. 6(a), 8(a), and 8(b), when the blade body 2 is rotated as abutted against a machining material M, the machining material M is cut first by the inner cutting edge 11 of each blade 4 and then by the outer cutting edge 10 after a slight delay. FIG. 8(a) shows a momentary state in which the cutting amount with respect to the machining material M is maintained at a constant level. In this state, all inner cutting edges 11 and outer cutting edges 10 cut the machining material M to a uniform depth ① at the same time. FIG. 8(b) shows a momentary state in which the cutting amount with respect to the machining material M is gradually increased from the state of FIG. 8(a). In this state, like the state of FIG. 8(a), all inner cutting edges 11 and outer cutting edges 10 cut the machining material M to a uniform depth ② at the same time. This increases anti-cutting resistance, which is disadvantageous.

SUMMARY OF THE INVENTION

Accordingly, it is an objective of the present invention to reduce anti-cutting resistance and obtain an optimal cutting state.

To achieve the foregoing and other objectives and in accordance with the purpose of the present invention, the invention provides a hole cutter. The hole cutter includes a cylindrical blade body with a rotational axis. The blade body includes a plurality of blades and a plurality of grooves, and each of the blades is arranged alternately with a corresponding one of the grooves around the rotational axis of the blade body. Each of the blades includes a cutting edge formed at an end of the blade. The blades include multiple types of blades with cutting edges that have different heights with respect to a predetermined reference plane perpendicular to the rotational axis.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objectives and advantages thereof, may best be understood by reference to the following description of the presently preferred embodiments together with the accompanying drawings in which:

FIG. 3 is a view explaining the shapes of the blades and grooves of FIG. 2;

FIGS. 5(a) and 5(b) are cross-sectional views each showing a portion of the hole cutter of FIG. 1(a) for explaining a cutting process;

DETAILED DESCRIPTION OF THE PREFERRED EMBODIMENTS

Figure 1:
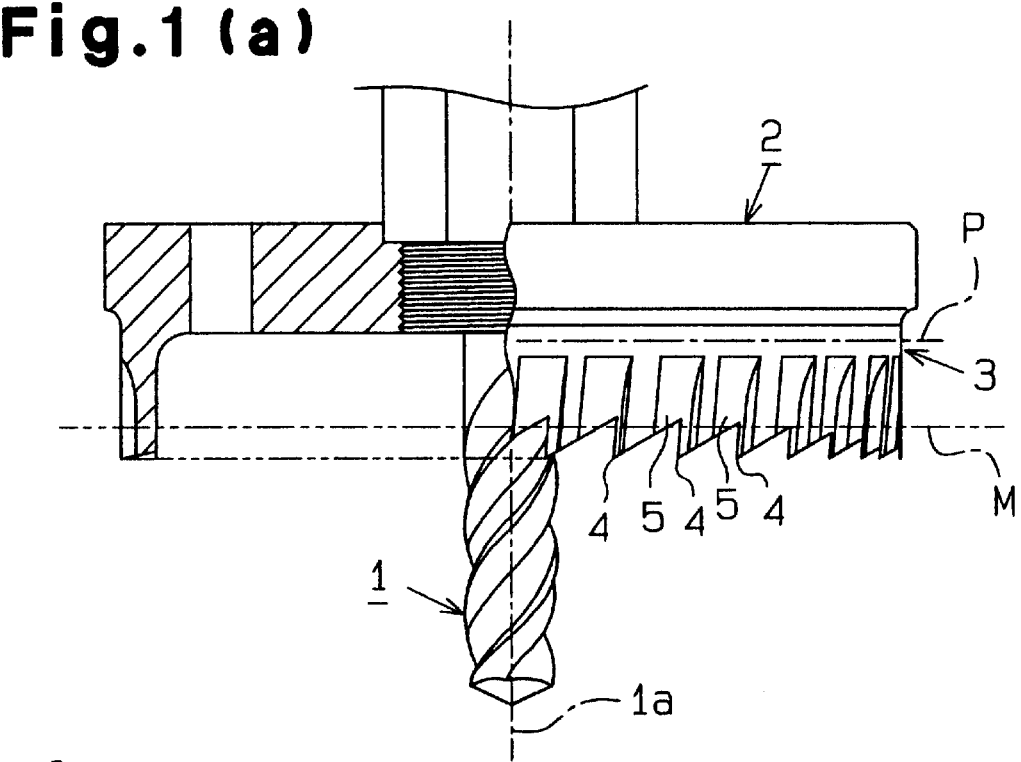
FIG. 1(a) is a front view with a cutaway portion showing a hole cutter according to an embodiment of the present invention.
FIG. 1(b) is a bottom view showing the hole cutter of FIG. 1(a)
Figure 1:
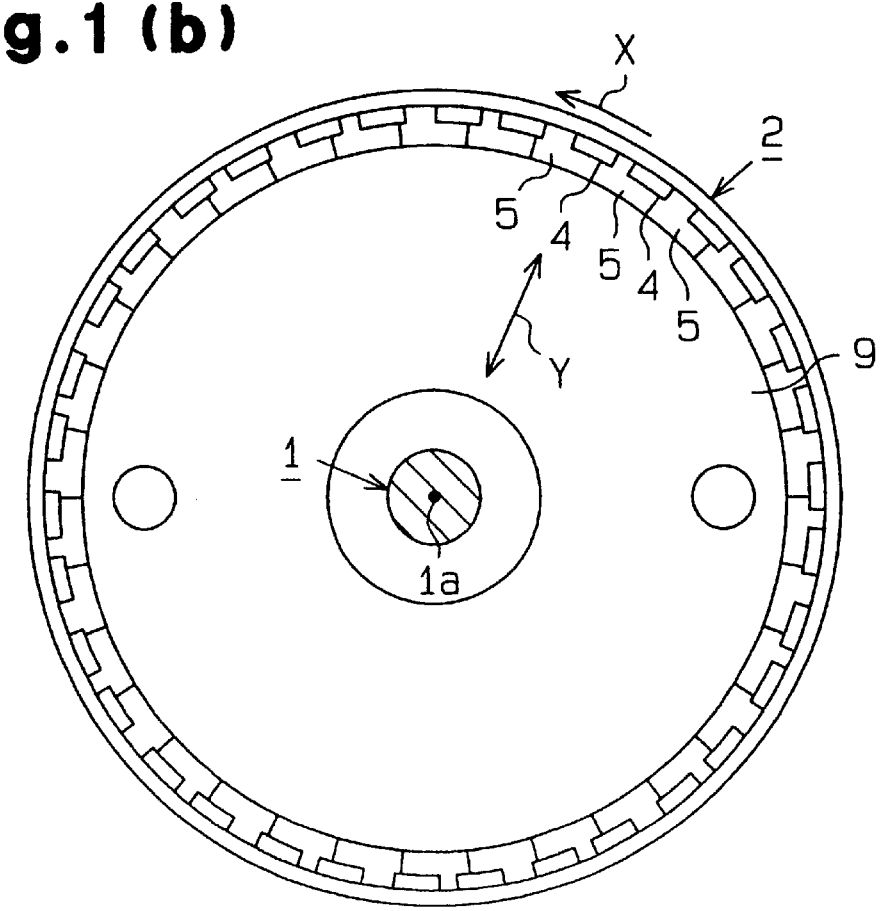

A hole cutter according to an embodiment of the present invention will now be described with reference to FIGS. 1(a) to 5(b). Same or like reference numerals are given to parts in FIGS. 1(a) to 5(b) that are the same as or like corresponding parts in FIGS. 6(a) to 8, which have been mentioned to in the "BACKGROUND OF THE INVENTION".

Figure 2:
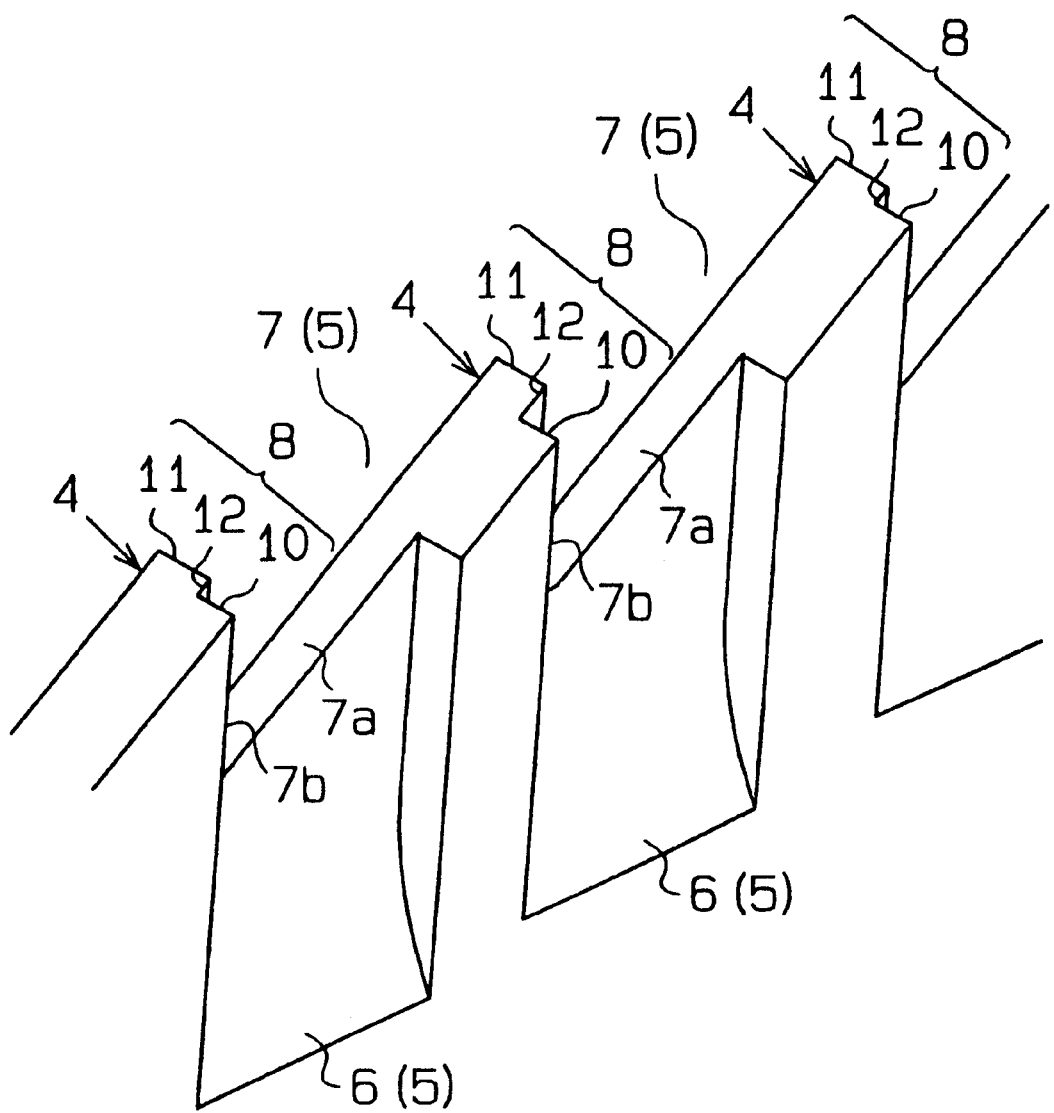
FIG. 2 is an enlarged perspective view showing a portion of the hole cutter of FIG. 1(a) corresponding to blades and grooves.

With reference to FIGS. 1(a) to 2, the hole cutter includes a center drill 1 and a cylindrical blade body 2, which is located around the center drill 1. The blade body 2 has a cylindrical wall 3, which is formed around the rotational axis 1a of the center drill 1 to define an inner hollow space 9. The cylindrical wall 3 includes a plurality of blades 4 and a plurality of grooves 5. Each one of the blades 4 is disposed alternately with a corresponding one of the grooves 5 in a rotational direction X of the blade body 2. Each groove 5 is defined by a recess 6 and a cutaway portion 7. In each groove 5, the recess 6 is formed in the outer side of the circumferential wall 3 at a position between the adjacent blades 4. The cutaway portion 7 is formed in an end surface of the circumferential wall 3 at a position corresponding to the recess 6. Each blade 4 has a cutting edge 8, which is formed in the end surface of the circumferential wall 3. The cutting edges 8 extend from the outer side of the circumferential wall 3 to the inner side of the circumferential wall 3. Each of the cutting edges 8 is formed continuously with the adjacent cutaway portions 7.

Each cutting edge 8 includes an outer cutting edge 10, an inner cutting edge 11, and a stepped cutting edge 12. More specifically, in each cutting edge 8, the outer cutting edge 10 is located closer to the outer circumference of the circumferential wall 3. The inner cutting edge 11 is located closer to the inner circumference of the circumferential wall 3. The stepped cutting edge 12 is located between the outer cutting edge 10 and the inner cutting edge 11. With reference to FIG. 3, the outer cutting edge 10 of each cutting edge 8 includes an outermost point 13, which is located at a radial outer position of the circumferential wall 3. In each cutting edge 8, a corner portion 14 is formed between the outer cutting edge 10 and the stepped cutting edge 12. The inner cutting edge 11 of each cutting edge 8 includes an intermediate point 15 and an innermost point 16. The intermediate point 15 of each inner cutting edge 11 is located between the stepped cutting edge 12 and the inner cutting edge 11. The innermost point 16 of each inner cutting edge 11 is located at a radial inner position of the circumferential wall 3.

In each cutting edge 8, the outer cutting edge 10 extends from the outermost point 13 to the corner portion 14 in a radial direction Y of the blade body 2. The inner cutting edge 11 extends from the intermediate point 15 to the innermost point 16 in the radial direction Y. The stepped cutting edge 12 extends from the corner portion 14 to the intermediate point 15 in the rotational direction X. The outer cutting edge 10 and the inner cutting edge 11 of each cutting edge 8 are located slightly offset from each other in the rotational direction X. More specifically, the outer cutting edge 10 is located rearward from the inner cutting edge 10 in the rotational direction X.

Figure 4A:
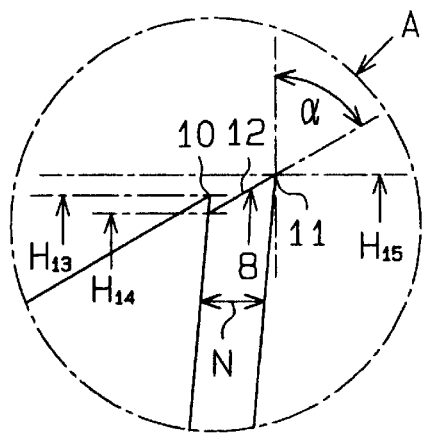
FIG. 4(a) is an enlarged view showing a portion of each blade, as viewed from the direction indicated by arrow A of FIG. 3.
Figure 4B:
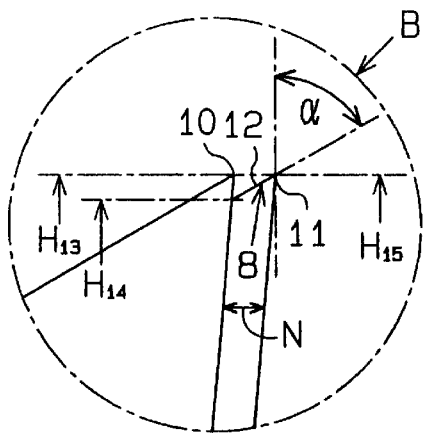
FIG. 4(b) is an enlarged view showing a portion of each blade, as viewed from the direction indicated by arrow B of FIG. 3.
Figure 4C:
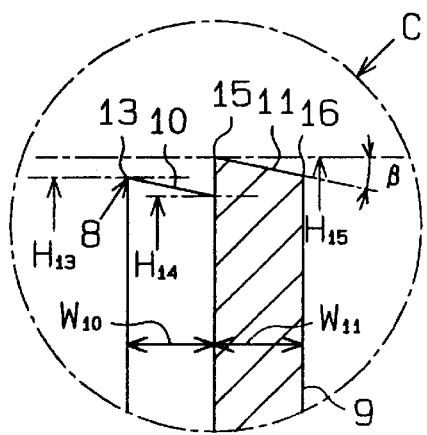
FIG. 4(c) is an enlarged view showing a portion of each blade, as viewed from the direction indicated by arrow C of FIG. 3.
Figure 4D:
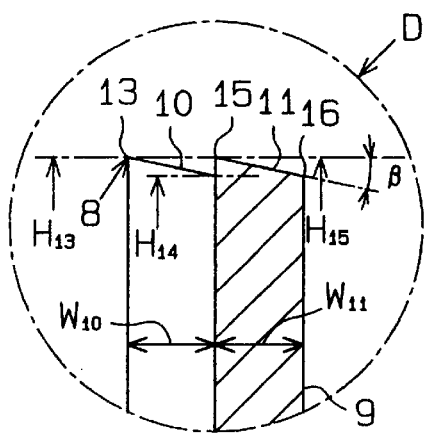
FIG. 4(d) is an enlarged view showing a portion of each blade, as viewed from the direction indicated by arrow D of FIG. 3.
Figure 4E:
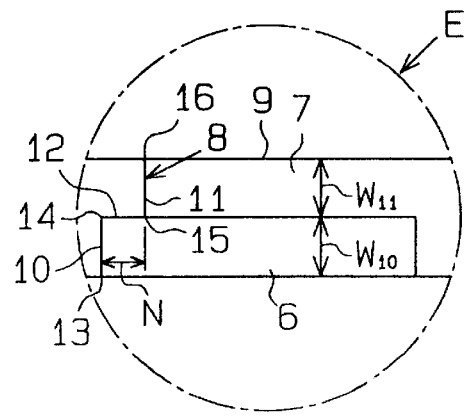
FIG. 4(e) is an enlarged view showing a portion of each blade, as viewed from the direction indicated by arrow E of FIG. 3.
Figure 4F:
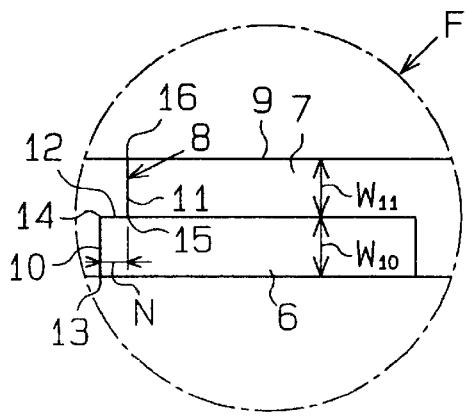
FIG. 4(f) is an enlarged view showing a portion of each blade, as viewed from the direction indicated by arrow F of FIG. 3.
Figure 6A:
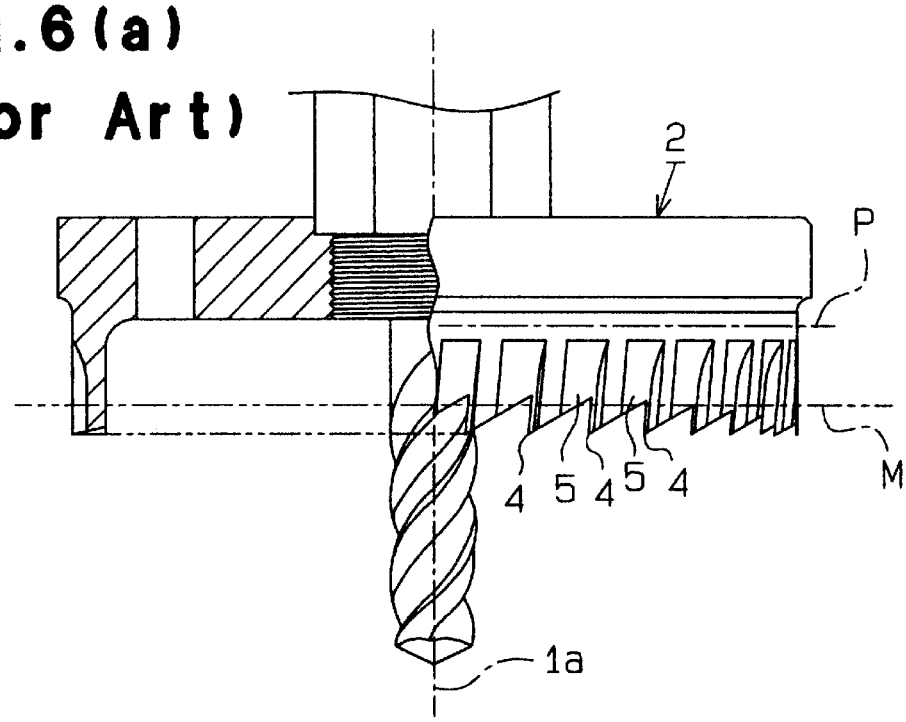
FIG. 6(a) is a front view with a cutaway portion showing a prior art hole cutter.
Figure 6B:
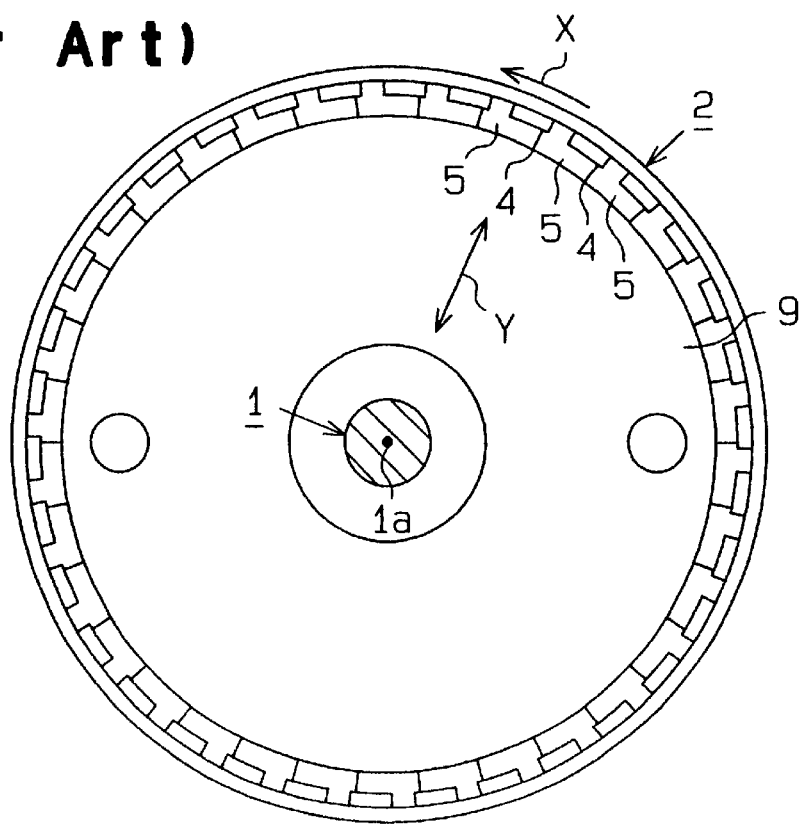
FIG. 6(b) is a bottom view showing the hole cutter of FIG. 6(a)
Figure 7:
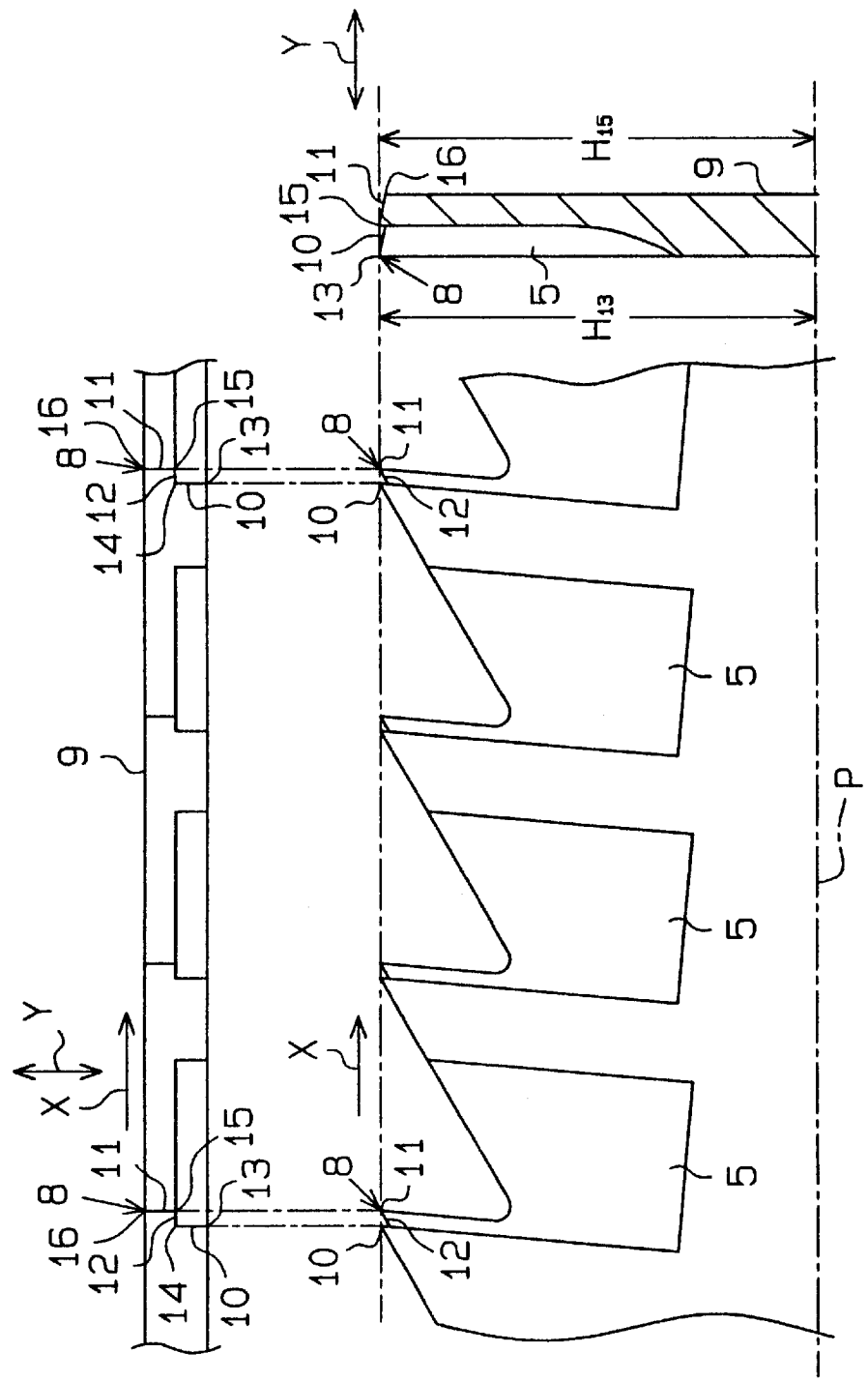
FIG. 7 is a view explaining the shapes of the blades and grooves of the hole cutter of FIG. 6(a)
Figures 8A, 8B:
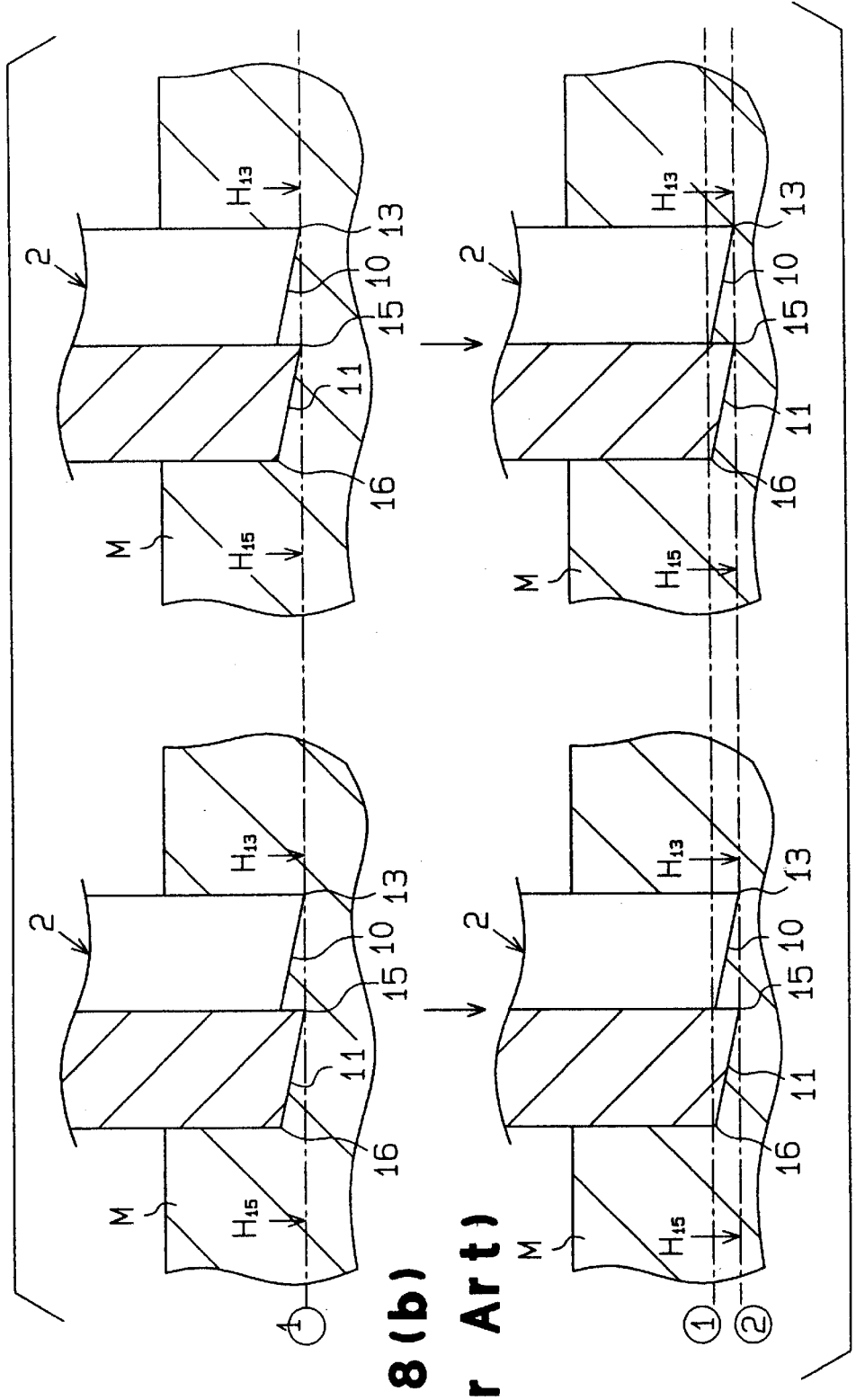
FIGS. 8(a) and 8(b) are cross-sectional views each showing a portion of the hole cutter of FIG. 6(a) for explaining a cutting process.

With reference to FIGS. 3 to 4(f), in each blade 4, the width $W_{10}$ of the outer cutting edge 10 in the radial direction Y is equal to the width $W_{11}$ of the inner cutting edge 11 in the radial direction Y. Further, the widths $W_{10}$ of the outer cutting edges 10 are equal for all blades 4. Likewise, the widths $W_{11}$ of the inner cutting edges 11 are equal for all blades 4. In addition, the inclination angles α (first predetermined angle) of the stepped cutting edges 12 with respect to the rotational axis 1a are equal for all blades 4.

With reference to FIGS. 2 and 3, the cutaway portion 7 of each groove 5 includes a slanted surface 7a and a vertical surface 7b. The slanted surface 7a is inclined with respect to one of the adjacent inner cutting edges 11 at the inclination angle α. The vertical surface 7b extends vertical along the rotational axis 1a from an end of the slanted surface 7a to the other of the adjacent inner cutting edges 11. The slanted surface 7a and the vertical surface 7b of each groove 7 are formed continuously in a smoothly curved manner. With reference to FIGS. 4(c) and 4(d), in each blade 4, the inclination angle β (second predetermined angle) of the outer cutting edge 10 with respect to a predetermined reference plane perpendicular to the rotational axis 1a is equal to the inclination angle β (second predetermined angle) of the inner cutting edge 11 with respect to the predetermined reference plane perpendicular to the rotational axis 1a. The inclination angles β of the outer cutting edges 10 are equal for all blades 4, and the inclination angles β of the inner cutting edges 11 are equal for all blades 4.

With reference to FIGS. 3 to 4(d), the heights $H_{15}$ of the intermediate points 15, which are located radially outward in the inner cutting edges 11, are equal for all blades. The heights $H_{15}$ are measured along the rotational axis 1a with respect to a predetermined reference plane P of FIGS. 1 and 3. The reference plane P is perpendicular to the rotational axis 1a. Likewise, the heights $H_{13}$ of the outermost points 13 and the heights $H_{14}$ of the corner portions 14 are measured along the rotational axis 1a with respect to the reference plane P.

Referring to FIGS. 3 to 4(d), the heights $H_{13}$ of the outermost points 13, which are located radially outward in the outer cutting edges 10, alternate in the rotational direction X. In other words, two types of blades 4, one type with the outer cutting edge (a first outer cutting edge) 10 of a relatively great height $H_{13}$ and the other with the outer cutting edge (a second outer cutting edge) 10 of a relatively small height $H_{13}$, are disposed with each other in the circumferential direction X. In each blade 4, with reference to FIGS. 3, 4(e), and 4(f), the height $H_{13}$ of the outermost point 13 is determined in relation to the dimension N of the stepped cutting edge 12 in the rotational direction X, or the interval N from the inner cutting edge 11 to the outer cutting edge 10 in the rotational direction X. The less the dimension N is, the greater the height $H_{13}$ of the outermost point 13 becomes.

With reference to FIGS. 4(b) and 4(d), the relatively great height $H_{13}$ of the outermost point 13 is substantially equal to the height $H_{15}$ of the intermediate point 15. Further, with reference to FIGS. 4(a) and 4(c), the height $H_{14}$ of the corner portion 14 is less than the relatively small height $H_{13}$ of the outermost point 13.

With reference to FIGS. 1(a), 5(a), and 5(b), when the blade body 2 is rotated as abutted against a machining material M, the blades 4 of the blade body 2 start to cut the machining body 2. During the cutting, the grooves 5 of the blade body 2 guide and discharge cut pieces. In each blade 4, the inner cutting edge 11, which is located forward from the outer cutting edge 10 in the rotational direction X, first cuts the machining material M. With a slight delay, the outer cutting edge 10 of each blade 4 cuts the machining material M. Thus, the cut pieces generated by the inner cutting edges 10 are discharged separately from the cut pieces generated by the outer cutting edges 10, such that the cut pieces are smoothly discharged. The blades 4 of the blade body 2 move through the machining material M to form a circular through hole in the machining material M.

FIG. 5(a) shows a momentary state in which the cutting amount with respect to the machining material M is maintained at a constant level. In this state, the first outer cutting edges 10 of the relatively great heights $H_{13}$ cut the machining material M to a depth ①. Meanwhile, the second outer cutting edges 10 of the relatively small heights $H_{13}$ cut the machining material M to a depth that is less than the depth ① in accordance with the height difference f between the first outer cutting edges 10 and the second outer cutting edges 10. In other words, cutting of the machining material M to a uniform depth by all outer cutting edges 10 is not performed. This reduces anti-cutting resistance.

FIG. 5(b) shows a momentary state in which the cutting amount with respect to the machining material M is gradually increased from the state of FIG. 5(a). In this state, the second outer cutting edges 10 cut the machining material M to the depth ①, or, with a slight delay, re-cut the portion of the machining material M that has been cut by the first outer cutting edges 10. In other words, the same portion of the machining material M is repeatedly cut in a stepped manner with a time lag. It is thus possible to reduce the anti-cutting resistance and obtain an optimal cutting state.

Unlike the outer cutting edges 10, all inner cutting edges 11 cut the machining material M to a uniform depth at the same time.

In the illustrated embodiment, with reference to FIGS. 4(e) to 4(f), different types of outer cutting edges 10 that have the outermost points 13 of different heights $H_{13}$ are easily formed simply by varying the dimensions N of the stepped cutting edges 12 in the rotational direction X.

Further, with reference to FIGS. 4(a) and 4(b), the stepped cutting edges 12 are inclined with respect to the rotational axis $1a$ at the angles α. With reference to FIGS. 4(c) and 4(d), the outer cutting edges 10 and the inner cutting edges 11 are inclined with respect to a predetermined reference plane perpendicular to the rotational axis $1a$ at the angles β. The inclination of the outer, inner, and stepped cutting edges 10, 11, 12 also reduces the anti-cutting resistance.

In the embodiment illustrated in FIGS. 1(a) to 5(b), the two types of blades 4, one type (a first blade 4) with the outermost point 13 of the relatively great height $H_{13}$ and the other (a second blade 4) with the outermost point 13 of the relatively small height $H_{13}$, are disposed alternately with each other. Instead, the hole cutter may include multiple groups of blades, each of which includes three or more types of blades with the outermost points 13 of different heights $H_{13}$. For example, each group may include three types of blades 4, which are disposed successively. That is, a first type has the outermost point 13 of a relatively great height $H_{13}$, a second type has the outermost point 13 of an intermediate height $H_{13}$, and a third type has the outermost point 13 of a relatively small height $H_{13}$.

In the embodiment illustrated in FIGS. 1(a) to 5(b), the blades 4 are formed integrally with the cylindrical blade body 2. However, separate chips may be attached to the blade body 2 to function as the blades 4.

The present examples and embodiments are to be considered as illustrative and not restrictive and the invention is not to be limited to the details given herein, but may be modified within the scope and equivalence of the appended claims.

What is claimed is:

1. A hole cutter including a cylindrical blade body with a rotational axis, wherein the blade body includes a plurality of blades and a plurality of grooves, each of the blades is arranged alternately with a corresponding one of the grooves around the rotational axis, each blade has a cutting edge formed at an end of the blade, and the cutting edge of each blade includes:

an outer cutting edge, which is located closer to the outer circumference of the blade body and extends substantially in a radial direction of the blade body;

an inner cutting edge, which is located closer to the inner circumference of the blade body and extends substantially in the radial direction of the blade body; and a stepped cutting edge, which is located between the outer cutting edge and the inner cutting edge and extends substantially in a circumferential direction of the blade body;

wherein the outer cutting edge of each blade has a point located at a radial outer position of the outer cutting edge, the inner cutting edge of each blade has a point between the inner cutting edge and the stepped cutting edge, the heights of the points of the inner cutting edges with respect to a predetermined reference plane perpendicular to the rotational axis are substantially equal for all blades, and the heights of the points of the outer cutting edges with respect to the reference plane are different among the blades.

2. The hole cutter according to claim 1, wherein the outer cutting edges include at least first outer cutting edges and second outer cutting edges, the point of each of the first outer cutting edges has a height substantially equal to that of the point of a corresponding one of the inner cutting edges, and the point of each of the second outer cutting edges has a height less than that of the point of a corresponding one of the inner cutting edges.

3. The hole cutter according to claim 1, wherein each of the blades with the first outer cutting edges is disposed alternately with a corresponding one of the blades with the second outer cutting edges around the rotational axis.

4. The hole cutter according to claim 1, wherein each of the stepped cutting edges is inclined with respect to the rotational axis at a first predetermined angle, and the inclination angles of the stepped cutting edges are substantially equal for all blades.

5. The hole cutter according to claim 4, wherein the height of the point of each outer cutting edge is determined in relation to a dimension of a corresponding stepped cutting edge in the circumferential direction of the blade body.

6. The hole cutter according to claim 1, wherein each of the outer cutting edges is located rearward from a corresponding one of the inner cutting edges in a direction in which the blade body is rotated to perform machining by the hole cutter.

7. The hole cutter according to claim 1, wherein each of the outer cutting edges is inclined with respect to the predetermined reference plane at a second predetermined angle, and the inclination angles of the outer cutting edges are substantially equal for all blades.

8. The hole cutter according to claim 1, wherein each of the inner cutting edges is inclined with respect to the predetermined reference plane at a second predetermined angle, and the inclination angles of the inner cutting edges are substantially equal for all blades.

9. The hole cutter according to claim 1, wherein each of the outer cutting edges is inclined with respect to the predetermined reference plane at a second predetermined angle, and each of the inner cutting edges is inclined with respect to the predetermined reference plane at an angle substantially equal to the inclination angle of a corresponding outer cutting edge.

* * * * *